(12) United States Patent
Kim et al.

(10) Patent No.: US 8,299,380 B2
(45) Date of Patent: Oct. 30, 2012

(54) POSITION INDICATING APPARATUS FOR CIRCUIT BREAKER AND CIRCUIT BREAKER HAVING THE SAME

(75) Inventors: In-Kyum Kim, Chungcheongbuk-Do (KR); Kil-Young Ahn, Daejeon (KR)

(73) Assignee: LS Industrial Systems Co., Ltd., Gyeonggi-Do (KR)

( * ) Notice: Subject to any disclaimer, the term of this patent is extended or adjusted under 35 U.S.C. 154(b) by 341 days.

(21) Appl. No.: 12/633,863

(22) Filed: Dec. 9, 2009

(65) Prior Publication Data
US 2010/0163378 A1    Jul. 1, 2010

(30) Foreign Application Priority Data

Dec. 31, 2008 (KR) .................. 10-2008-0138526

(51) Int. Cl.
*H01H 9/00* (2006.01)
(52) U.S. Cl. ..................... 200/308; 200/50.26
(58) Field of Classification Search .............. 200/308, 200/50.21–50.26
See application file for complete search history.

(56) References Cited

U.S. PATENT DOCUMENTS

| 4,703,137 | A  | * | 10/1987 | Bohnen et al. ............. 200/50.25 |
| 6,787,725 | B2 |   | 9/2004  | Kim et al. |
| 6,884,949 | B2 |   | 4/2005  | Yoon |
| 7,227,279 | B2 |   | 6/2007  | Kim |
| 7,847,203 | B2 | * | 12/2010 | Narayanan et al. ........ 200/50.26 |

FOREIGN PATENT DOCUMENTS

| JP | 55-4648    | 1/1980  |
| JP | 61-192611  | 11/1986 |
| JP | 62-101319  | 6/1987  |
| JP | 11-341623  | 12/1999 |
| KR | 10-2003-0070288 | 8/2003 |

OTHER PUBLICATIONS

U.S. Appl. No. 12/633,827 to Park, filed Dec. 9, 2009.
U.S. Appl. No. 12/635,911 to Woo, filed Dec. 11, 2009.
U.S. Appl. No. 12/641,769 to Kim, filed Dec. 18, 2009.
U.S. Appl. No. 12/641,946 to Seo, filed Dec. 18, 2009.
U.S. Appl. No. 12/645,783 to Kim, filed Dec. 23, 2009.
U.S. Appl. No. 12/645,620 to Kim et al., filed Dec. 23, 2009.
U.S. Appl. No. 12/651,501 to Tak et al., filed Jan. 4, 2010.
Korea Office action, mail date is Sep. 2010.
Japan Office action, mail date is Jan. 31, 2012.
China Office Action mailed Jun. 5, 2012.

* cited by examiner

*Primary Examiner* — Renee S Luebke
*Assistant Examiner* — Lheiren Mae Caroc
(74) *Attorney, Agent, or Firm* — Greenblum & Bernstein, P.L.C.

(57) ABSTRACT

Disclosed are a position indicating apparatus for a circuit breaker and a circuit breaker having the same. The circuit breaker having a position indicating apparatus comprises a cradle having a bus bar terminal and a load terminal; a main body having a bus bar connection unit and a load connection unit respectively connected to the bus bar terminal and the load terminal, and configured to be movable to a run position that the terminals and the connection units are connected to each other, and to a test position that the terminals and the connection units are separated from each other; and a position indicating apparatus configured to outwardly display a position of the main body by interworking with motion of the main body, wherein the position indicating apparatus comprises: a movable pin interworking with motion of the main body; and a display unit configured to display a position of the main body corresponding to a position of the movable pin by interworking with motion of the movable pin. Accordingly, the position of the main body of the circuit breaker can be intuitively checked rapidly and precisely.

8 Claims, 5 Drawing Sheets

POSITION INDICATING APPARATUS FOR CIRCUIT BREAKER AND CIRCUIT BREAKER HAVING THE SAME

RELATED APPLICATION

The present disclosure relates to subject matter contained in priority Korean Application No. 10-2008-0138526, filed on Dec. 31, 2008, which is herein expressly incorporated by reference in its entirety.

BACKGROUND OF THE INVENTION

1. Field of the Invention

The present invention relates to a position indicating apparatus for a circuit breaker and a circuit breaker having the same, and particularly, to a position indicating apparatus for a circuit breaker capable of rapidly and precisely checking a position of a main body of a circuit breaker, the main body configured to be movable with respect to a cradle, and a circuit breaker having the same.

2. Background of the Invention

Generally, a circuit breaker may be largely classified into a draw out type and a fixed type. The fixed circuit breaker may have a configuration that a main body is fixedly installed in a panel of a distributing board. And, the draw out circuit breaker may comprise a cradle, and a main body drawn out with respect to the cradle.

The draw out circuit breaker may be used in a distributing board managed by using a plurality of electric devices including a breaker so as to drive or control a power plant, a transformer substation, an electric motor, etc.

The cradle of the draw out circuit breaker may be provided with a bus bar terminal and a load terminal. The main body of the draw out circuit breaker may be provided with a bus bar connection unit connected to the bus bar terminal, and a load connection unit connected to the load terminal. The main body of the circuit breaker may include a fixed contactor fixedly disposed so as to be connected to one of the bus bar connection unit and the load connection unit; a movable contactor connected to another of the bus bar connection unit and the load connection unit, and movable to contact or to be separated from the fixed contactor; and a driving unit configured to drive the movable contactor.

The main body of the circuit breaker may be movable to a run position in which a current flows as the bus bar terminal and the load terminal of the cradle are respectively connected to the bus bar connection unit and the load connection unit of the main body, and may be movable to a test position where the bus bar terminal and the load terminal of the cradle are respectively separated from the bus bar connection unit and the load connection unit of the main body. The main body and the cradle of the circuit breaker may be provided with an interlock device for fixing the main body to the run position and test position.

The cradle may be provided with a position indicator for indicating a position of the main body. The position indicator may be implemented as a sticker having characters on its surface so as to indicate a position of the main body. The position indicator may be attached to the cradle along a moving direction of the main body of the circuit breaker. On the surface of the position indicator, may be provided characters, lines and shapes which indicate the run position and test position of the main body. More concretely, when the main body of the circuit breaker is disposed at the test position, lines, shapes and characters which indicate the run position of the main body are visually blocked by the main body. In this case, lines, shapes and characters which indicate the test position of the main body are outwardly displayed. Accordingly, it can be checked that the main body of the circuit breaker is disposed at the test position. When the main body of the circuit breaker is moved to the run position, lines, shapes and characters which indicate the run position of the main body are outwardly displayed. Accordingly, it can be checked that the main body of the circuit breaker is disposed at the run position. Here, the lines, shapes and characters which indicate the test position of the main body are also outwardly displayed.

However, the conventional circuit breaker has the following problems.

Firstly, the position indicator (sticker) provided with lines, shapes and characters which indicate the current position of the main body is attached onto an upper surface of the cradle. And, lines, shapes, and characters which indicate a corresponding position of the main body as the main body is moved are partially or wholly displayed to indicate the current position of the main body. As a result, it is difficult to intuitively check the position of the main body of the circuit breaker.

SUMMARY OF THE INVENTION

Therefore, an object of the present invention is to provide a position indicating apparatus for a circuit breaker capable of rapidly and precisely checking a position of a circuit breaker, and a circuit breaker having the same.

Another object of the present invention is to provide a position indicating apparatus for a circuit breaker capable of intuitively checking the current position of a main body of a circuit breaker by outwardly displaying only one position of a plurality of positions of the main body, and a circuit breaker having the same.

To achieve these and other advantages and in accordance with the purpose of the present invention, as embodied and broadly described herein, there is provided a circuit breaker having a position indicating apparatus, comprising: a cradle having a bus bar terminal and a load terminal; a main body having a bus bar connection unit and a load connection unit respectively connected to the bus bar terminal and the load terminal, and configured to be movable to a run position that the terminals and the connection units are connected to each other, and to a test position that the terminals and the connection units are separated from each other; and a position indicating apparatus configured to outwardly display a position of the main body by interworking with motion of the main body, wherein the position indicating apparatus comprises: a movable pin interworking with motion of the main body; and a display unit configured to display a position of the main body corresponding to a position of the movable pin by interworking with motion of the movable pin.

The position indicating apparatus may further comprise a cam member configured to move the movable pin by contacting the movable pin; and an elastic member configured to provide an elastic force such that the movable pin contacts with the cam member.

The elastic member may be implemented as a tension coil spring.

The position indicating apparatus may further comprise a guide member configured to guide motion of the movable pin. The guide member may comprise a guide panel having a guide slot into which the movable pin is inserted; supporting plates bent from both sides of the guide panel; and fixed plates disposed at the ends of the supporting plates, and fixed to a bottom surface of the main body of the circuit breaker.

The position indicating apparatus may further comprise a window configured to expose one region of the display unit to the outside.

The display unit may comprise a first display unit configured to display the run position of the main body, and a second display unit configured to display the test position of the main body. The window may be formed such that one of the first and second display units is exposed to the outside.

The window may be formed at the main body of the circuit breaker.

The cam member may comprise a coupling plate disposed along a moving direction of the main body of the circuit breaker; and a pressing plate connected to the coupling plate, and having contact portions at one side thereof.

The contact portions may comprise a first contact portion with which the movable pin contacts when the main body is in the test position; a second contact portion extending from one side of the first contact portion, and protruding more than the first contact portion; and a third contact portion formed at one side of the second contact portion, protruding more than the second contact portion toward a lateral side, and with which the movable pin contacts when the main body is in the run position.

To achieve these and other advantages and in accordance with the purpose of the present invention, as embodied and broadly described herein, there is also provided a position indicating apparatus for a circuit breaker, comprising: a movable pin movable by interworking with a main body installed so as to be movable to a run position and a test position with respect to a cradle; and a display unit configured to outwardly display a position of the main body corresponding to a position of the movable pin by interworking with motion of the movable pin.

The position indicating apparatus may further comprise a cam member configured to guide motion of the movable pin by contacting the movable pin; and an elastic member configured to provide an elastic force such that the movable pin contacts with the cam member.

The position indicating apparatus may further comprise a window configured to expose one region of the display unit to the outside.

According to another aspect of the present invention, there is provided a position indicating apparatus for a circuit breaker, comprising: a movable pin movable by interworking with a main body installed so as to be movable to a run position and a test position with respect to a cradle; a display unit configured to display a position of the main body corresponding to a position of the movable pin by interworking with motion of the movable pin; a cam member configured to guide motion of the movable pin by contacting the movable pin; an elastic member configured to provide an elastic force such that the movable pin contacts with the cam member; and a window configured to expose one region of the display unit to the outside.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
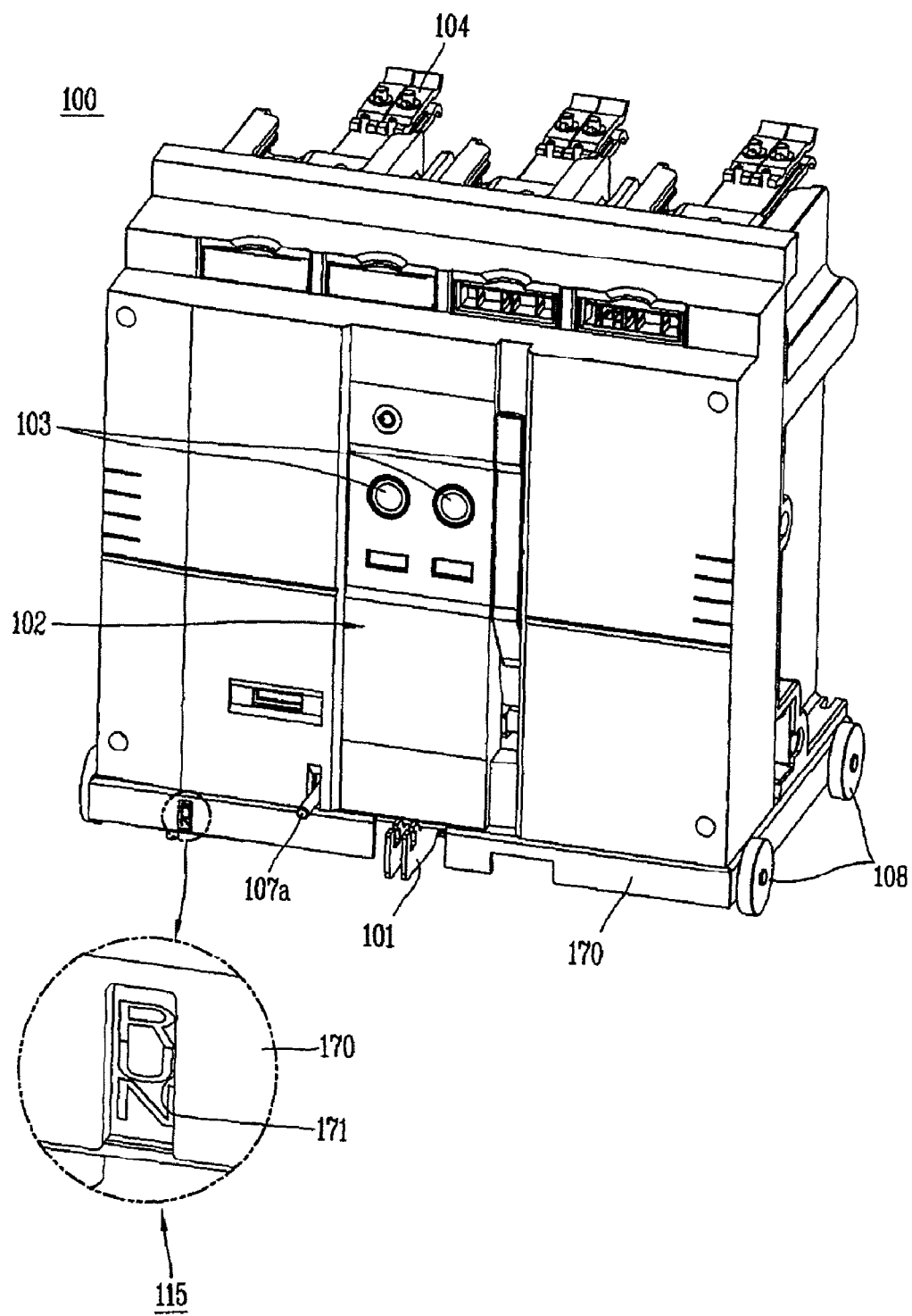
FIGS. 1 and 2 are perspective views of a main body and a cradle of a circuit breaker having a position indicating apparatus according to a first embodiment of the present invention.

Description will now be given in detail of the present invention, with reference to the accompanying drawings.

Referring to FIGS. 1 to 4, a circuit breaker having a position indicating apparatus according to the present invention comprises: a cradle 110 having a bus bar terminal 112 and a load terminal 113; a main body 100 having a bus bar connection unit 104 and a load connection unit 105 respectively connected to the bus bar terminal 112 and the load terminal 113, and configured to be movable to a run position that the terminals 112, 113 and the connection units 104, 105 are connected to each other, and to a test position that the terminals 112, 113 and the connection units 104, 105 are separated from each other; and a position indicating apparatus 115 configured to outwardly display a position of the main body 100 by interworking with motion of the main body 100.

Figure 2:
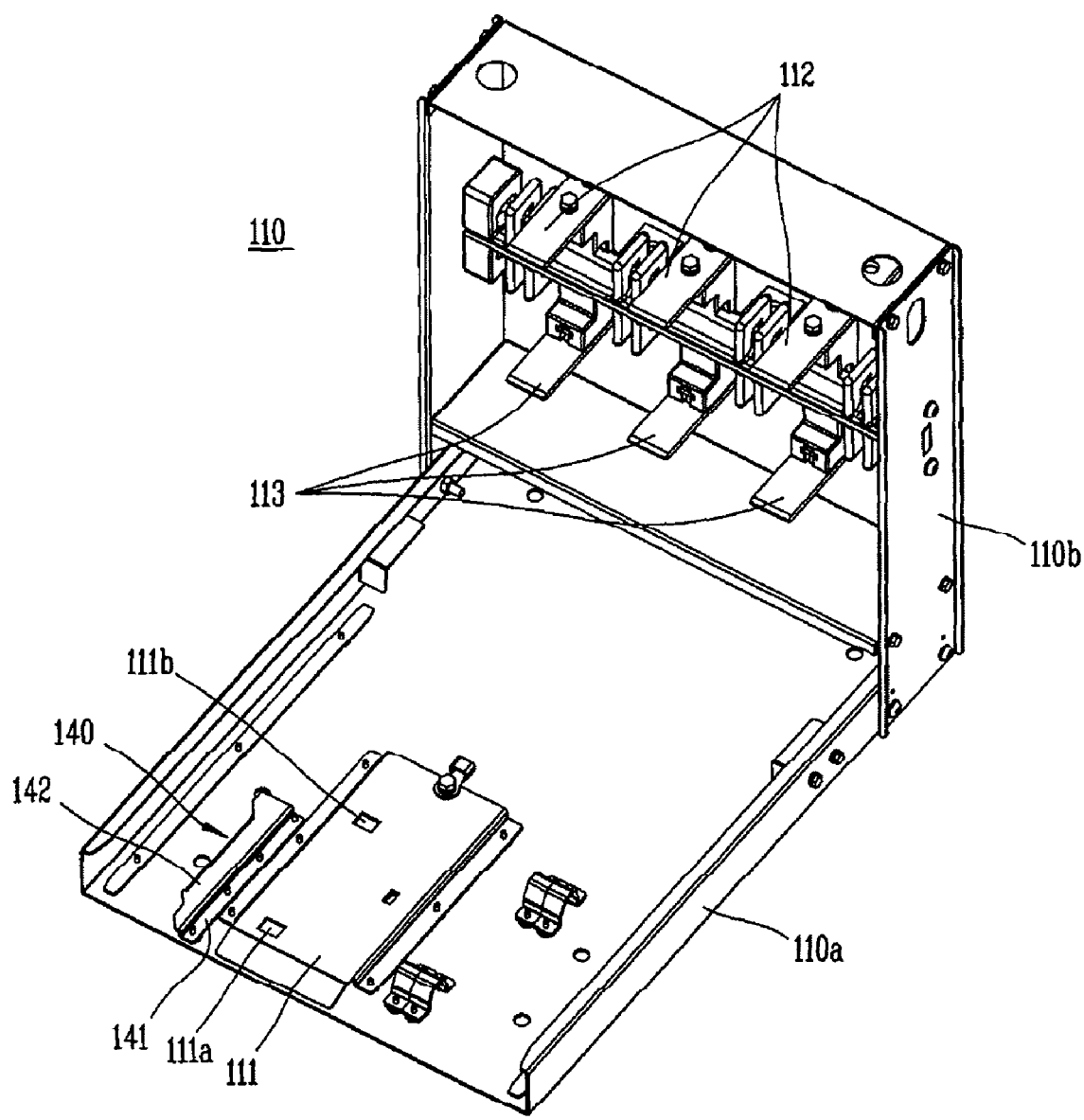

As shown in FIG. 2, the cradle 110 may include a horizontal portion 110a on which the main body 100 is disposed to be movable, and a vertical portion 110b to which or from which the main body 100 is connected or separated. At the vertical portion 110b, may be provided a plurality of bus bar terminals 112 connected to a bus bar, and a plurality of load terminals 113 connected to a load. The bus bar terminals 112 and the load terminals 113 may be disposed to be spaced from each other in upper and lower directions. The bus bar terminals 112 may be disposed to be spaced from each other in a horizontal direction. And, the load terminals 113 may be also disposed to be spaced from each other in a horizontal direction. The bus bar terminals 112 and the load terminals 113 may be configured in three, respectively.

Figure 3:
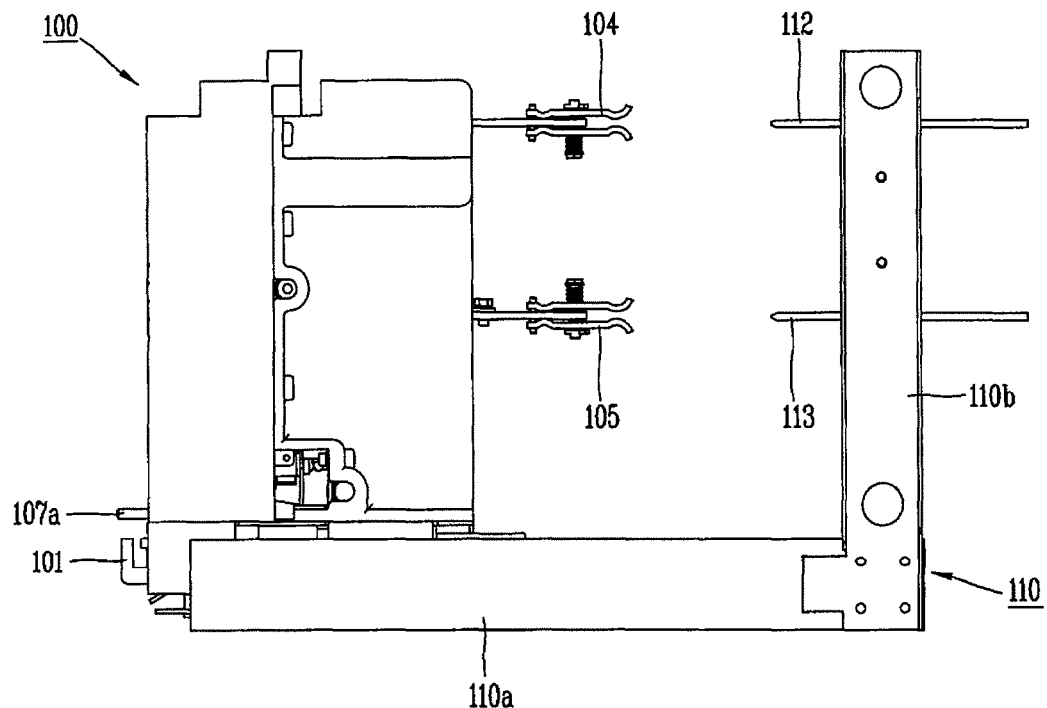
FIG. 3 is a side view of the circuit breaker, which shows a coupled state between the main body of the circuit breaker of FIG. 1, and the cradle of FIG. 2.
Figure 4:
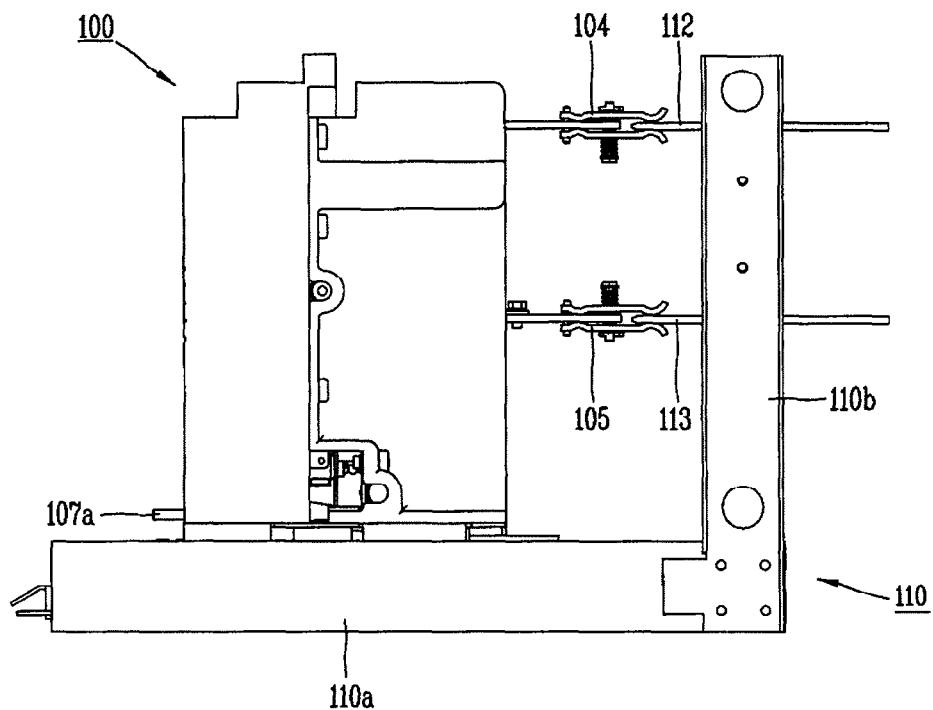
FIG. 4 is a view showing a run position of the main body of the circuit breaker of FIG. 3.
Figure 5:
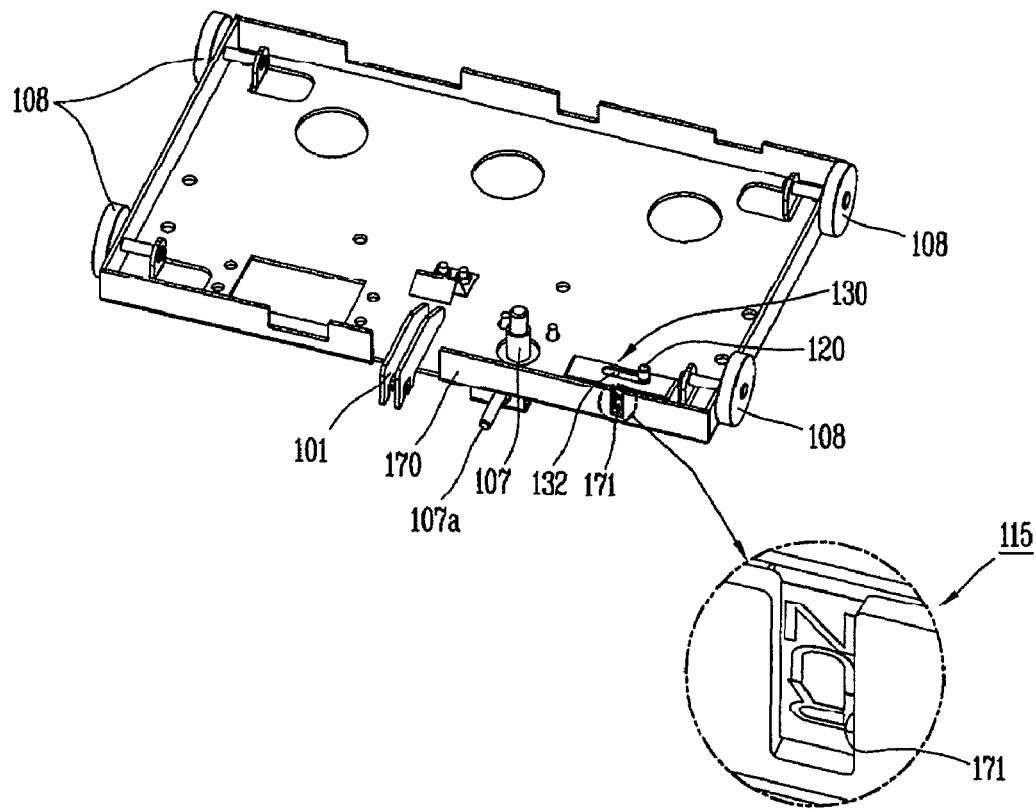
FIG. 5 is a bottom view of a frame unit the main body of the circuit breaker of FIG. 1.

As shown in FIGS. 1 and 3, the main body 100 of the circuit breaker may include the bus bar connection unit 104 and the load connection unit 105 respectively connected to the bus bar terminal 112 and the load terminal 113 of the cradle 110; an opening and closing unit 102 disposed between the bus bar connection unit 104 and the load connection unit 105, and configured to open and close a load; and a frame unit 170 configured to support the bus bar connection unit 104, the load connection unit 105, and the opening and closing unit 102 at a lower side.

Although not shown, the opening and closing unit 102 may include a fixed contactor fixedly disposed so as to be connected to one of the bus bar connection unit 104 and the load connection unit 105; a movable contactor connected to another of the bus bar connection unit 104 and the load connection unit 105, and movable to contact or to be separated from the fixed contactor; and a driving unit configured to drive the movable contactor such that the movable contactor contacts or is separated from the fixed contactor.

A plurality of adjustment buttons 103 for adjusting the driving unit may be provided on a front surface of the opening and closing unit 102. One of the adjustment buttons 103 may be implemented as a connecting button serving to contact the movable contactor to the fixed contactor. Another of the adjustment buttons 103 may be implemented as a disconnecting button serving to separate the movable contactor from the fixed contactor.

A plurality of rollers 108 may be provided at the frame unit 170 for facilitation of motion of the main body 100. A handle coupling unit 101 configured to couple thereto a handle (not shown) for moving the main body 100 of the circuit breaker may be provided on a front surface of the frame unit 170.

The main body 100 and the cradle 110 of the circuit breaker may be provided with an interlock device for fixing the main body 100 to the run position and test position. The interlock device may include an interlock link 107 disposed at a bottom surface of the main body 100, and position determination grooves 111a, 111b formed at the cradle 110 so as to insert the interlock link 107 therein.

More concretely, the interlock link 107 may be provided at the frame unit 170. The interlock link 107 may be arranged so as to be movable in upper and lower directions. A handle 107a of the interlock link 107 may be provided on the front surface of the frame unit 170 so as to move the interlock link 107 in upper and lower directions.

The position determination grooves 111a, 111b may be formed at an interlock plate 111 disposed at the horizontal portion 110a of the cradle 110. The position determination grooves may include a run position determination groove 111b configured to insert a lower end of the interlock link 107 when the main body 100 is in a run position, and a test position determination groove 111a configured to insert the lower end of the interlock link 107 when the main body 100 is in a test position.

The position indicating apparatus 115 may include a movable pin 120 interworking with motion of the main body 100, and a display unit 160 configured to display a position of the main body 100 corresponding to a position of the movable pin 120 by interworking with motion of the movable pin 120.

The position indicating apparatus 115 may further include a cam member 140 configured to guide motion of the movable pin 120 by contacting the movable pin 120, and an elastic member 134 configured to provide an elastic force such that the movable pin 120 contacts with the cam member 140.

The frame unit 170 may be provided with a window 171 configured to expose one region of the display unit 160 to the outside. More concretely, the window 171 may be configured to expose only one of two positions (i.e., the run position and the test position) of the main body 100 to the outside through the display unit 160.

The movable pin 120 may be provided at the main body 100 of the circuit breaker. More concretely, the movable pin 120 may be positioned below the frame unit 170 so as to be movable to a horizontal direction with respect to a moving direction of the main body 100. The movable pin 120 may be disposed in upper and lower directions of the frame unit 170.

The display unit 160 may be coupled to the movable pin 120.

And, the display unit 160 may be disposed at one side of the window 171. This is in order to display one of the plurality of positions of the main body 100 (i.e., the run position and the test position) by exposing one region of the display unit 160 to the outside through the window 171. This enables the current position of the main body 100 to be intuitively checked.

The position indicating apparatus 115 may further include a guide member 130 configured to guide motion of the movable pin 120. The guide member 130 may be provided with a guide slot 132 for inserting one region of the movable pin 120 and moving the movable pin 120. The guide slot 132 may have a long length corresponding to a moving path of the movable pin 120.

The guide member 130 may comprise a guide panel 131 having a guide slot 132 into which the movable pin 120 is inserted; supporting plates 133 bent from both sides of the guide panel 131 with an angle of 90°; and fixed plates 135 bent from the ends of the supporting plates 133, and fixed to a bottom surface of the main body 100 of the circuit breaker. A through hole 136 for inserting a coupling member (not shown) such as a screw coupled to the frame unit 170 may be formed at each of the fixed plates 135. The through hole 136 may be formed in plurality in number.

The fixed plates 135 of the guide member 130 may be coupled to a bottom surface of the frame unit 170.

The display unit 160 may be formed in a plate shape, and may be arranged in upper and lower directions. The display unit 160 for indicating the position of the main body 100 of the circuit breaker may include a first display unit 160a and a second display unit 160b.

The first and second display units 160a, 160b may include characters on their surfaces so as to indicate the position of the main body 100 of the circuit breaker. The first and second display units 160a, 160b may be spacing from each other along a moving direction of the movable pin 120.

The first display unit 160a may display the run position of the main body 100 of the circuit breaker. The first display unit 160a may be provided with characters of "RUN". The second display unit 160b may display the test position of the main body 100 of the circuit breaker. The second display unit 160b may be provided with characters of "TEST". The characters of "RUN" on the first display unit 160a, and the characters of "TEST" on the second display unit 160b may be arranged in upper and lower directions.

The display unit 160 may be coupled to the movable pin 120 so as to be interworking with motion of the movable pin 120. The display unit 160 may be further provided with a coupling unit 161 bent from a lower part of the display unit 160 in a horizontal direction so as to be coupled to the movable pin 120. Accordingly, the display unit 160 may be formed in an approximate shape. The display unit 160 may be arranged at a rear side of the frame unit 170 having the window 171. Accordingly, the display unit 160 may be guided by the front surface of the frame unit 170, and the coupling unit 161 may be guided by contacting the guide panel 131.

A movable pin hole 162 for inserting the movable pin 120 thereinto may be penetratingly formed at the coupling unit 161. As the movable pin 120 inserted into the movable pin hole 162 passes through the guide slot 132, a lower end of the movable pin 120 is protruding from a lower end of the guide panel 131 by a predetermined length.

The cam member 140 may be provided at the cradle 110. More concretely, as shown in FIG. 2, the cam member 140 may be installed on an upper surface of the horizontal portion 110a of the cradle 110 so as to contact the movable pin 120. The cam member 140 may be arranged along a moving direction of the main body 100 of the circuit breaker.

The cam member 140 may be provided with contact portions at one side thereof. The contact portions serve to move the movable pin 120 in a horizontal direction by contacting the movable pin 120.

The cam member 140 may include a coupling plate 141 disposed along a moving direction of the main body 100 of the circuit breaker, and a pressing plate 142 connected to the coupling plate 141 and having the contact portions at one side thereof.

The coupling plate 141 is arranged along the moving direction of the main body 100 so as to contact the upper surface of the horizontal portion 110a of the cradle 110. The coupling plate 141 may be provided with a plurality of through holes 143 for coupling with the cradle 110.

The pressing plate 142 may be upwardly bent from one edge of the coupling plate 141, and then may be horizontally bent. Contact portions having different protrusion lengths so as to move the movable pin 120 may be formed at one side surface of the pressing plate 142. The contact portions may be formed in stair shapes.

Figure 7:
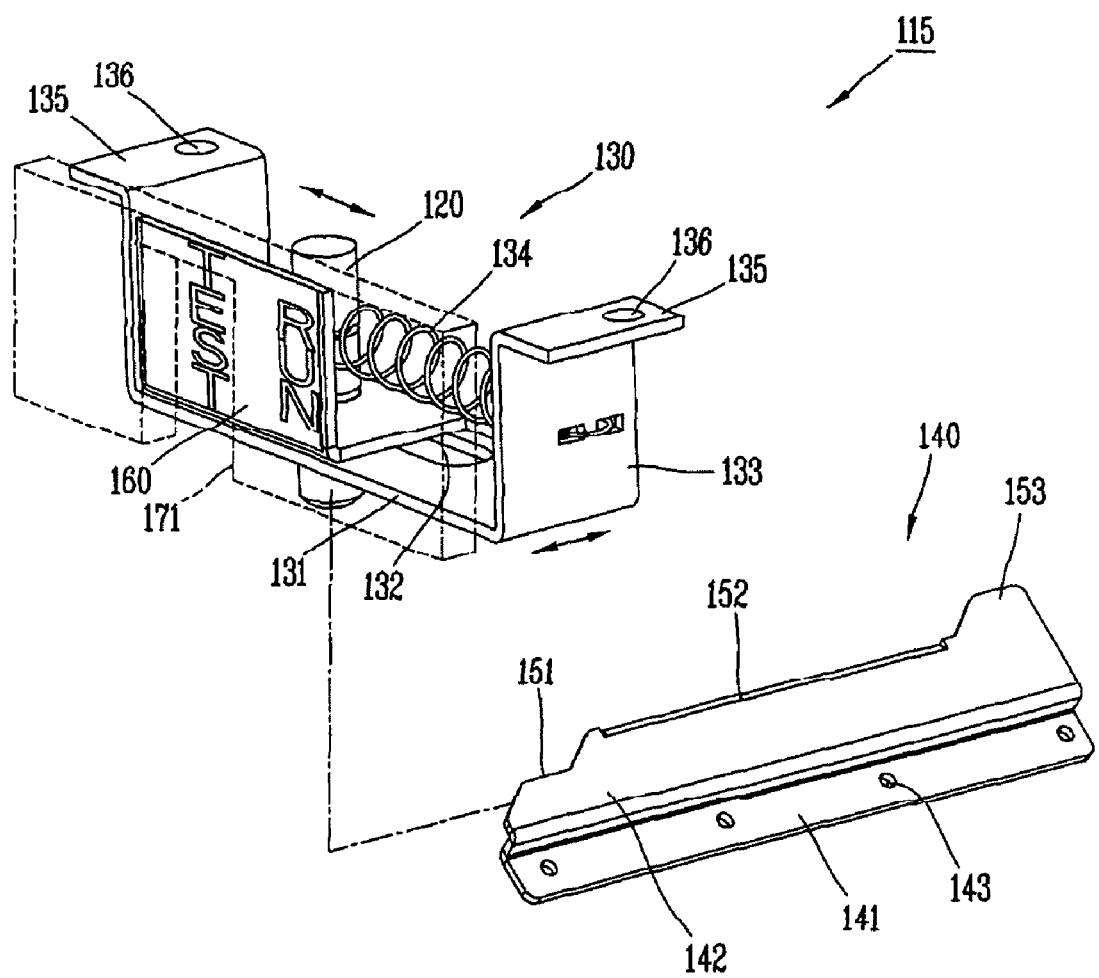
FIG. 7 is a view showing the operation of the movable pin of FIG. 6, and a cam member of FIG. 2.

As shown in FIG. 7, the contact portions may include a first contact portion 151 with which the movable pin 120 contacts when the main body 100 is in the test position; a second contact portion 152 extending from one side of the first contact portion 151, and protruding more than the first contact portion 151; and a third contact portion 153 formed at one side of the second contact portion 152, protruding more than the second contact portion 152 toward a lateral side, and with which the movable pin 120 contacts when the main body 100 is in the run position. That is, the second contact portion is protruding more than the first contact portion toward the movable pin 120 based on the coupling plate 141. And, the third contact portion is protruding more than the second contact portion.

Figure 6:
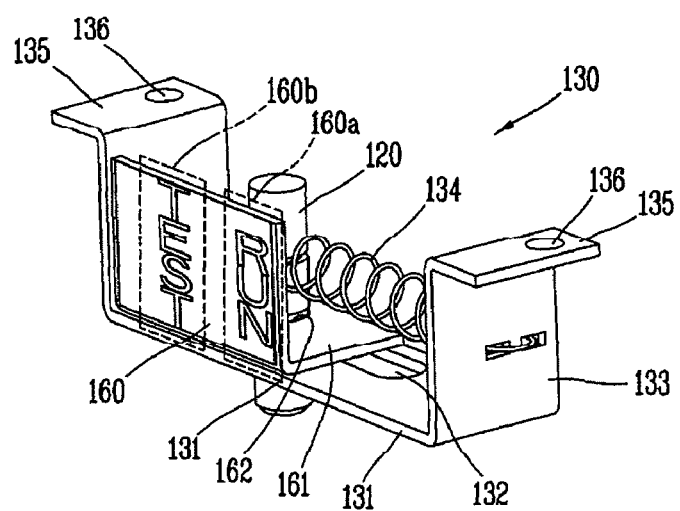
FIG. 6 is an enlarged perspective view of a movable pin and a guide member of FIG. 5.

An elastic member 134 configured to provide an elastic force such that the movable pin 120 contacts with the cam member 140 may be provided at the movable pin 120. As shown in FIG. 6, the elastic member 134 may be implemented as a tension coil spring. One end of the elastic member 134 is fixed to the supporting plate 133, and another end thereof is connected to the movable pin 120. Here, the elastic member 134 may be also implemented as a compression coil spring.

Under these configurations, as shown in FIG. 3, when the main body 100 of the circuit breaker is in the test position, the main body 100 is arranged at a front side of the horizontal portion 110a of the cradle 110. When the main body 100 of the circuit breaker is in the test position, the bus bar connection unit 104 and the load connection unit 105 are separated from the bus bar terminal 112 and the load terminal 113, respectively. In this case, the interlock link 107 is in an inserted state into the test position determination groove 111a. Accordingly, the main body 100 is prevented from being separated from the cradle 110.

The movable pin 120 is in a contacted state with the first contact portion 151 of the cam member 140 by an elastic force of the elastic member 134. Accordingly, only the characters of "TEST" of the second display unit 160b of the display unit 160 are exposed to the outside through the window 171. This allows a user to intuitively check that the main body 100 of the circuit breaker is in the test position by merely viewing the window 171.

When the main body 100 of the circuit breaker is to be moved to the run position, the handle of the interlock link 107 is upwardly pressed. As a result, a lower end of the interlock link 107 is separated from the test position determination groove 111a. Once the main body 100 of the circuit breaker is backwardly pressed, the main body 100 is backwardly moved while the rollers 108 are rotated. Here, the movable pin 120 is moved in a direction (horizontal direction) perpendicular to the moving direction of the main body 100 by being elastically moved while contacting the first contact portion 151 and the second contact portion 152, sequentially.

Once the main body 100 of the circuit breaker continues to move, the bus bar connection unit 104 and the load connection unit 105 are connected to the bus bar terminal 112 and the load terminal 113, respectively. When the main body 100 of the circuit breaker is precisely located at the run position, the lower end of the interlock link 107 is inserted into the run position determination groove 111b. Accordingly, the main body 100 is prevented from being separated from the cradle 110.

As the main body 100 of the circuit breaker moves to the run position from the test position, the movable pin 120 comes in contact with the third contact portion 153 via the first and second contact portions 151, 152 sequentially. At the same time, the display unit 160 is movable with respect to the window 171.

Once the main body 100 of the circuit breaker is stopped at the run position, the movable pin 120 comes in contact with the third contact portion 153. In this case, only the characters of "RUN" of the first display unit 160a of the display unit 160 are exposed to the outside through the window 171. This allows the user to easily and rapidly check that the main body 100 of the circuit breaker is in the run position by merely viewing the window 171.

As aforementioned, according to the first embodiment of the present invention, the current position of the main body 100 of the circuit breaker can be rapidly and precisely checked by providing the movable pin interworking with motion of the main body, and the display unit interworking with motion of the movable pin.

Furthermore, the current position of the main body 100 of the circuit breaker can be intuitively checked by outwardly displaying only one position of a plurality of positions of the main body, through the window configured to expose one region of the display unit to the outside.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A circuit breaker having a position indicating apparatus, the circuit breaker comprising:
    a cradle having a bus bar terminal and a load terminal;
    a main body having a bus bar connection unit and a load connection unit respectively connected to the bus bar terminal and the load terminal, and configured to be movable to a run position that the terminals and the connection units are connected to each other, and to a test position that the terminals and the connection units are separated from each other; and a position indicating apparatus configured to outwardly display a position of the main body by interworking with motion of the main body, wherein the position indicating apparatus comprises:

a movable pin interworking with motion of the main body;

a guide member configured to guide motion of the movable pin;

a cam member configured to move the movable pin by contacting the movable pin;

an elastic member configured to provide an elastic force such that the movable pin contacts with the cam member; and a display unit configured to display a position of the main body corresponding to a position of the movable pin by interworking with motion of the movable pin, wherein the guide member comprises:

a guide panel having a guide slot into which the movable pin is inserted:

supporting plates bent from both sides of the guide panel; and fixed plates disposed at the ends of the supporting plates, and fixed to a bottom surface of the main body of the circuit breaker.

2. The circuit breaker having a position indicating apparatus of claim 1, wherein the elastic member is implemented as a tension coil spring.

3. The circuit breaker having a position indicating apparatus of claim 1, wherein the position indicating apparatus further comprises a window configured to expose one region of the display unit to the outside.

4. The circuit breaker having a position indicating apparatus of claim 3, wherein the display unit comprises:

a first display unit configured to display the run position of the main body; and a second display unit configured to display the test position of the main body, and wherein the window is formed such that one of the first and second display units is exposed to the outside.

5. The circuit breaker having a position indicating apparatus of claim 4, wherein the window is formed at the main body of the circuit breaker.

6. The circuit breaker having a position indicating apparatus of claim 1, wherein the cam member comprises:

a coupling plate disposed along a moving direction of the main body of the circuit breaker; and a pressing plate connected to the coupling plate, and having contact portions at one side thereof.

7. The circuit breaker having a position indicating apparatus of claim 6, wherein the contact portions comprises:

a first contact portion with which the movable pin contacts when the main body is in the test position;

a second contact portion extending from one side of the first contact portion, and protruding more than the first contact portion; and a third contact portion formed at one side of the second contact portion, protruding more than the second contact portion toward a lateral side, and with which the movable pin contacts when the main body is in the run position.

8. A position indicating apparatus for a circuit breaker, comprising:

a movable pin movable by interworking with a main body installed so as to be movable to a run position and a test position with respect to a cradle;

a display unit configured to display a position of the main body corresponding to a position of the movable pin by interworking with motion of the movable pin;

a cam member configured to guide motion of the movable pin by contacting the movable pin;

an elastic member configured to provide an elastic force such that the movable pin contacts with the cam member;

a guide member configured to guide motion of the movable pin; and a window configured to expose one region of the display unit to the outside, wherein the guide member comprises:

a guide panel having a guide slot into which the movable pin is inserted:

supporting plates bent from both sides of the guide panel; and fixed plates disposed at the ends of the supporting plates, and fixed to a bottom surface of the main body of the circuit breaker.

* * * * *